United States Patent
Ram et al.

(10) Patent No.: US 6,253,271 B1
(45) Date of Patent: Jun. 26, 2001

(54) BRIDGE FOR DIRECT DATA STORAGE DEVICE ACCESS

(75) Inventors: Tamir Ram, Sunnyvale; John V. Vincenet, Cupertino; Kumar Gajjar; Sara Abraham, both of San Jose; Syang Edward Syu, Fremont; Paul Lester Popelka, Cupertino, all of CA (US)

(73) Assignee: Auspex Systems, Inc., Santa Clara, CA (US)

(*) Notice: Subject to any disclaimer, the term of this patent is extended or adjusted under 35 U.S.C. 154(b) by 0 days.

(21) Appl. No.: 09/372,707

(22) Filed: Aug. 11, 1999

Related U.S. Application Data

(63) Continuation of application No. 08/956,186, filed on Oct. 22, 1997, now Pat. No. 5,941,969.

(51) Int. Cl.[7] ................................................ G06F 15/16
(52) U.S. Cl. ................................ 710/128; 709/212
(58) Field of Search .................................... 710/100, 107, 710/119, 128, 129, 126; 709/212, 238, 250, 253

(56) References Cited

U.S. PATENT DOCUMENTS

| 5,163,131 | 11/1992 | Row et al. . |
| 5,355,453 | 10/1994 | Row et al. . |
| 5,541,853 | 7/1996 | Croft . |
| 5,634,099 | 5/1997 | Andrews et al. . |
| 5,787,459 | 7/1998 | Stallmo et al. ................ 711/112 |
| 5,790,816 | 8/1998 | Fok et al. . |
| 5,802,366 | 9/1998 | Row et al. . |
| 5,819,292 | 10/1998 | Hitz et al. .................... 707/203 |
| 5,931,918 | 8/1999 | Row et al. ..................... 709/300 |
| 5,941,969 | 8/1999 | Ram et al. ..................... 710/128 |

OTHER PUBLICATIONS

Auspex Systems, "The NS 7000 NetServer Family Pocket Guide", Doc. No. 300–MC063.
Auspex Systems, "NS 7000/250 Series NetServers", Product Information, Doc.No. 300–DS046.
Auspex Systems, "NS 7000/250 Series NetServers", Product Information, Doc.No. 300–DS047.

*Primary Examiner*—Glenn A. Auve
(74) *Attorney, Agent, or Firm*—Fish & Richardson P.C.

(57) ABSTRACT

A bridge in a file server provides a direct link to data storage devices in satisfaction of data requests. The file server has one or more function-specific processors, including network processors (NPs) and file storage processors (FSPs), all operating in parallel and communicating over an interconnect bus. Each FSP is also connected to one or more disk controllers which in turn manage one or more data storage devices. To minimize local bus contention between data storage devices and network communications, separate internal buses are provided in the FSP, one internal bus connected to the interconnect bus for network communications and one internal bus connected to disk controllers for performing I/O operations on data storage devices. The bridge provides a path between the FSP's internal buses so that, for disk access requests, data from a particular data storage device may be sent by the disk controller via the bridge over the interconnect bus to the NP servicing the request with minimal involvement of the local FSP processor.

24 Claims, 7 Drawing Sheets

BRIDGE FOR DIRECT DATA STORAGE DEVICE ACCESS

This is a continuation of U.S. application Ser. No. 08/956,186, filed Oct. 22, 1997, now U.S. Pat. No. 5,941,969.

BACKGROUND OF THE INVENTION

The invention relates to computer networks, and more particularly, to communications between data storage devices and clients in computer networks.

The growth of client/server based computing, where applications and other resources are distributed among a network of computers having one or more servers and clients, is driven by a need for fast, reliable and secure access to vast amounts of shared data in organizations. As the number of clients serviced by the server grows, along with increased client data processing capability made possible by advances in microprocessor technology, conventional servers can be overloaded with requests from clients.

In response, a number of architectures have been developed to address server overloads, including distributed processor architecture, symmetric multi-processor architecture, parallel processor architecture and hypercube architecture. However, some of these architectures still direct file requests coming over the network to a host processor, which in turn makes appropriate requests to an input/output (I/O) processor controlling data storage devices such as disks in satisfaction of the request from a client. Data from disks is buffered in a memory section before being transmitted to the requester under the control of the host processor. Such micro-management by the host processor can result in delays and can be wasteful of the host processor's capabilities. Additionally, the host processor, if overloaded, may itself become a bottleneck in the transfer of data between the disk and the requesting client. Further, when the processor is involved in the data processing loop, host bus bandwidth may be reduced, as data from disks is typically transferred over a bus and stored in a host memory before being sent to the requesting client over the bus, thus reducing available bus bandwidth.

To minimize this problem, certain architectures shift the I/O load to dedicated sub-systems that handle disk requests. However, even such sub-systems deploy local processors to handle requests arriving over the network and to supervise disk controllers in transferring data. These processors still are intimately involved with the file transfer process. Further, the bus contention problem still exists with respect to local buses supporting the local processor. Thus, the potential bottleneck still exists whenever the local processor or the host processor is directly involved with the disk I/O.

As intimate involvements of the processor in disk I/O handling are inefficient and uneconomical, what is needed is an apparatus in a file server that can directly transfer data from data storage devices to the client over the network with minimal involvement by any processor. Moreover, what is needed is an apparatus which minimizes bus contention and provides high data availability and fast access to shared data with minimal overheads.

SUMMARY OF THE INVENTION

The present invention relates to a bridge in a file server which provides a direct link to data storage devices in satisfaction of data requests. The file server has one or more function-specific processors, including network processors (NPs) and file storage processors (FSPs), all operating in parallel and communicating over an interconnect bus. To minimize local bus contention between data storage devices and network communications, the FSP provides separate internal buses. One internal bus connects to the interconnect bus for network communications. The other internal bus connects to disk controllers for performing I/O operations on data storage devices connected thereto. The bridge provides a path between the FSP's internal buses so-that, for disk access requests, data from a particular data storage device may be sent by the disk controller via the bridge over the interconnect bus to the NP servicing the request with minimal involvement of a local FSP processor.

During operation, client requests are received and analyzed by NPs, and if acceptable, relayed to one of the FSPs which manages a virtual file system of mass storage devices connected to the FSP. The local FSP processor determines the location of a buffer on the requesting NP for storing data to be transmitted and instructs the disk controller so that data retrieved by data storage devices is directly deposited into the buffer on the NP over the interconnect bus via the bridge. After issuing the instruction to the disk controller, the local FSP processor is finished and thus incurs only a minimal overhead for each I/O request.

Upon receipt of the instruction, the disk controller causes data storage devices to retrieve the requested data and sends the result directly to the buffer of the requesting NP via the bridge. The requesting NP in turn packetizes the result and sends the packets to the requesting client.

Advantages of the system includes the following. In place of conventional overheads associated with local FSP processor/disk controller management scheme where data from disk is sent to the local FSP's RAM for eventual transmission to the requesting NP, the bridge provides a direct path between the client and file storage processors which eliminates unnecessary intermediate data routing. As the processor in the FSP need not be involved, the bridge avoids contention on internal buses of the FSP for data transmissions. Further, since the processor is no longer intimately involved with disk transfer operations, the bridge minimizes the local FSP processor overhead. The decoupling of the data storage devices from the local FSP processor enhances system performance. The bridge is also flexible in that it can be bypassed for transactions that require local FSP processor handling.

The resulting server with the bridge is powerful, scalable and reliable enough to allow users to consolidate their data onto one high performance system instead of scores of smaller, less reliable systems. This consolidation of data resources onto a powerful server brings a number of advantages to the client-server environment, including increased ease of administration and quicker and more reliable data access than conventional client-server architectures.

Other features and advantages will be apparent from the following description and the claims.

DETAILED DESCRIPTION

The invention will be described with respect to particular embodiment thereof, and reference will be made to the drawings, in which.

DESCRIPTION OF THE PREFERRED EMBODIMENTS

Figure 1:
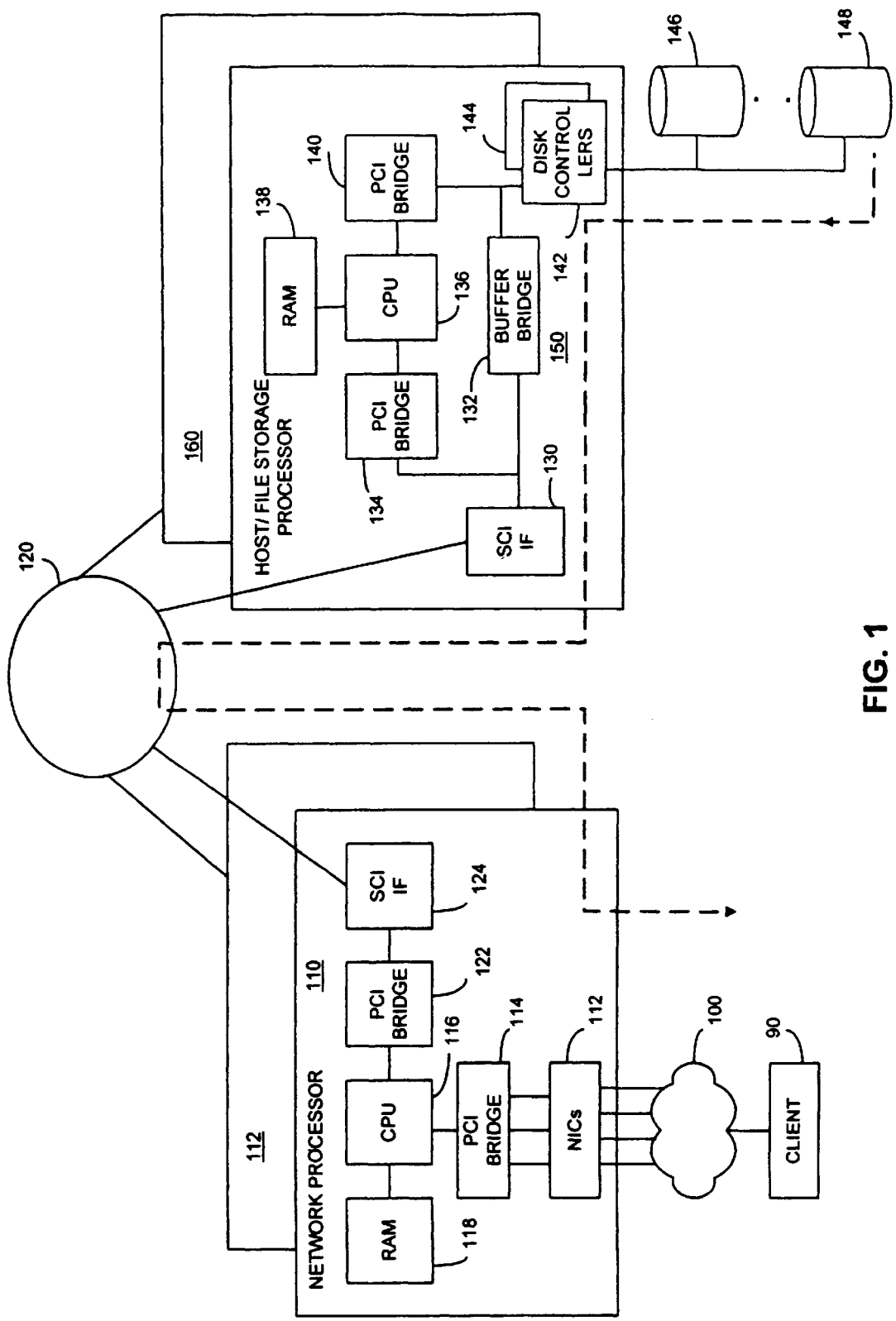
FIG. 1 is a block diagram of a computer system having a plurality of loosely coupled, function specific processors.

Referring now to FIG. 1, a computer system having a plurality of loosely-coupled processors that collectively provide a high-performance file server is illustrated. One or more client computers 90 are connected over a network 100 to one or more network processors (NPs) 110 and 112. Each of NPs 110 and 112 has one or more network interface cards (NICs) 112 which are connected to the network 100. In the illustrated embodiment, the NICs 112 are connected into a peripheral component interconnect (PCI) bridge 114. The PCI bridge 114 in turn is connected to a central processing unit (CPU) 116 which supplies processing capability for the NP 110.

The CPU 116 receives data and instructions from a random access memory (RAM) 118. The RAM 118 preferably supports a read cache which buffers network request data in case the client 90 requests previously retrieved data. To increase the performance of the system, the system of FIG. 1 leverages a unified memory image capability of the system, which means that all processors can access the same memory space, to provide caches having segments which are dynamically allocatable to different NPs. The dynamic allocation process reduces the need to move or shift data around the system of FIG. 1 by having FSPs monitor the location of cached files such that, when an incoming request from one NP results in a hit in the read cache of a second NP, the responding FSP can simply request the second NP to respond. In this manner, the read cache of the individual NPs is global, resulting in additional efficiencies and performance gain as disk accesses are minimized.

The CPU 116 is also shown connected to a second bridge 122, a PCI bridge, which in turn is connected to an interconnect bus 120, such as a scalable coherent interface (SCI), via a card 124. The SCI interconnect bus 120 may be deployed in a number of topologies, including a ring configuration where sub-systems are connected as a ring which does not support hot-pluggability. Alternatively, the SCI interconnect 120 may be a multi-ported switch where each sub-system is on its own SCI ring and therefore can be hot-plugged. Additional port switches can be used to improve the system bandwidth. The standard SCI interconnect uses five meter point-to-point cabling with two fifty-pin high density Small Computer System Interface (SCSI) style connectors.

The network processors 110 and 112 provide all protocol processings between a network layer data format and an internal file server format for communicating client requests to other NPs and FSPs in the system.

In the illustrated embodiment, data is supplied to clients 90 from one or more file storage processors (FSPs) 150 and 160 which are connected to the SCI interconnect bus 120. The FSP 150 connects to the SCI interconnect bus 120 using an SCI interface 130. The SCI interface 130 is connected to a buffer bridge 132 and a PCI bridge 134. The PCI bridge 134 in turn is connected to a CPU 136, which handles host processing operations as well as file processing operations.

The CPU 136 is connected to a RAM 138 which supports a metadata cache as well as a write cache to increase file storage access requests. The metadata cache in the RAM 138 contains file management information, including a directory name look-up table, among others. The directory name look-up table is used to speed up directory search operations, as UFS directories are flat and must be searched sequentially. Further, the directory name look-up table maintains hits and misses for short file names. In the directory name look-up table, data structures are kept in a least recently used (LRU) order and maintained as a hashed table.

The CPU 136 is also connected to a second PCI bridge 140 which in turn is connected to one or more disk controllers 142 and 144. The disk controllers 142 and 144 in turn drive a plurality of data storage devices 146 and 148. The buffer bridge 132 is also connected to the PCI bridge 140 to provide a path that enables network processors 110 and 112 that are connected to the SCI interconnect bus 120 to directly communicate with data storage devices 146–148 via disk controllers 142–144. Hence, a short-cut path is provided through which the client 90 can receive data from the combination of disk controllers 142–144 and data storage devices 146–148 via the buffer bridge 132. As the local CPU 136 and the RAM 138 of the file storage processor 150 are minimally involved in the disk operation, response times to data storage requests from the client 90 are reduced. Further, the contention for local FSP buses is reduced. Additionally, the CPU 136 as well as the RAM 138 of the file storage processor 150 are available for handling other tasks required of the file storage processor 150. The off-loading of tasks from the CPU 136 and the RAM 138 ultimately results in a more responsive server system.

Figure 2:
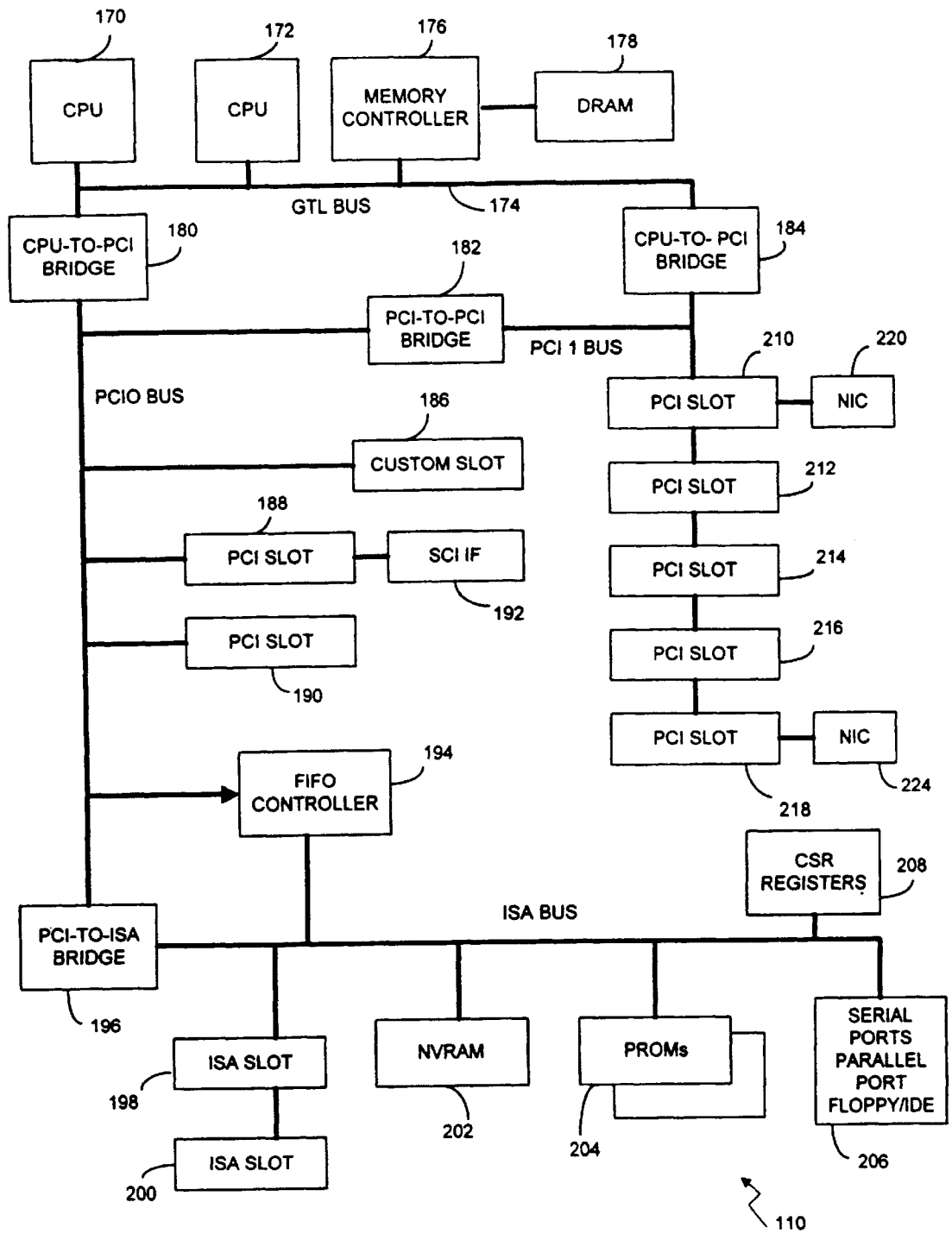
FIG. 2 is a schematic illustration of a network processor in FIG. 1.

Referring now to FIG. 2, a schematic diagram of one embodiment of the network processor 110 is illustrated. The network processor 110 is a dual processor system with CPUs 170 and 172. The CPU 170 and CPU 172 communicate over a processor bus 174. In one implementation, the CPU 170 and 172 are Pentium-Pro microprocessors, available from Intel Corporation and the processor bus 174 is a GTL bus for Pentium-Pro processors. Also connected to the processor bus 174 is a memory controller 176 which drives a dynamic read random access memory (DRAM) array 178. The DRAM array 178 provides a buffer for implementing the NP read cache.

A plurality of CPU-to-PCI bridges 180 and 184 are also connected to the processor bus 174 to provide PCI0 bus and PCI1 bus, respectively. The CPU-to-PCI bridge 180 is also connected to the CPU-to-PCI bridge 184 via a PCI-to-PCI bridge 182.

Turning now to the PCI0 bus, the bridge 180 is connected to a custom proprietary slot 186. The PCI bridge 180 is also connected to one or more PCI slots 188 and 190. Particularly, the PCI slot 188 is connected to an SCI interface board 192 which connects with the interconnect bus 120 (FIG. 1). The PCI-to-SCI connection is provided via a PCI-to-SCI bridge that uses components available from Dolphin Interconnect Solutions.

Additionally, the bridge 180 is connected to a first in first out (FIFO) controller 194 and to a PCI to industry standard architecture (ISA) bridge 196. The System Command FIFO on the system 110 is designed to accept writes from the primary PCI bus and writes data to a circular buffer located in main memory. The FIFO is placed so as to provide positive acknowledgment of message reception through a transaction protocol. The pointer passing protocols between SCI nodes selects the proper SCI transactions to ensure that the 8-byte message pointers are transferred as atomic operations.

The FIFO can be accessed at two different address ranges. One address range is dedicated to interprocessor communication across the SCI interconnect bus 120. Interprocessor messages are 8-bytes in size. Further, a local FIFO address range is available for diagnostics purposes and the messages are 4-bytes in size. If a write of a different size than expected is attempted, the FIFO controller 194 will respond with a Target Abort and no data will be forwarded to main memory. Also, a FIFO-Bad-Size-Write error bit will be set in the FIFO status register as well as a FIFO-Error bit in the Interrupt Request register.

The FIFO controller 194 contains a local buffer for holding a single 8-byte message. If a write to the FIFO is attempted while this local buffer is full, the FIFO controller 194 will issue a retry on the PCI bus, since it expects to be able to empty the local buffer soon. However, to prevent deadlock, if the FIFO controller 194 issues 15 retries in a row, then it assumes that something is wrong with the DMA controller and issues Target Aborts. It will also turn on the FIFO-Watchdog-Error bit in the FIFO status register and set the FIFO-Error bit in the Interrupt Request register.

The FIFO uses ISA DMA channel 5 to write the FIFO data into main memory. The ISA DMA controller is set up with the location and size of the circular buffer located in main memory and placed in an auto-initialize mode. Because the FIFO controller 194 uses the lower address bits of the circular buffer to select which words to place where, the FIFO buffer in main memory must be 8-byte aligned.

The FIFO controller 194 keeps track of the total number of available FIFO entries. It contains a 14-bit counter for this function, allowing a maximum of 16 K entries in the FIFO. Since each FIFO entry is 8 bytes, this equates to a maximum FIFO size of 128 K bytes. At reset, this counter is cleared, indicating that there is no more space in the FIFO (full). Writing to a AddSize register in the FIFO controller 194 will add the value written to the current available space register in the controller.

In order to support an interrupt mode, the FIFO controller 194 also contains a FIFO Size register. Software programs this 14-bit register with the size of the FIFO buffer in memory. Anytime the Free Size and FIFO Size registers are not equal, the FIFO is not empty and so an interrupt is generated.

All data written into main memory is 8 bytes in size. When data is written to the primary FIFO address, all 8 written bytes will be put into main memory. When data is written to the local FIFO address, the 4 bytes written will be the high half of the 8 bytes that are DMA'd into main memory. The low half will be whatever the low 4 bytes were in the last primary FIFO write. (In other words, a write to the local FIFO address space only changes the upper half of the controller's buffer, but the entire 8-byte buffer is DMA'd into memory.)

During normal polling operation, the FIFO process flow is as follows:

1) The FIFO controller 194 decodes a write on the PCI bus. If the write is not the correct size or if the available space counter is 0, the controller responds with a Target Abort. If the FIFO controller 194's buffer is busy with a previous FIFO write that hasn't been DMA'd to main memory yet, the FIFO controller 194 responds with a local retry. Otherwise, the FIFO controller 194 latches the write data and requests DMA service on the ISA bus.
2) When the ISA DMA controller wins an arbitration, the ISA DMA controller will read the 8-byte message out of the FIFO controller 194 and put the message into main memory. The FIFO controller 194 then decrements its available space counter by 1, and the ISA DMA controller will increment its address pointer to the next FIFO element.
3) The CPU polls the location that the next FIFO message will be placed into and notices that a new message has just arrived. The CPU will process this message and then clear out the location.
4) Periodically, the CPU will write to the AddSize register to tell the FIFO controller 194 that the CPU has processed "n" messages and therefore, those spaces are available again. The CPU can do this for every message individually, but it would be more efficient to only write to the AddSize register when a large number of messages have been processed.

During interrupt mode, the main difference is that in step 3, instead of the CPU polling memory for the next message, an interrupt is generated. This interrupt will remain on until the Free Size register equals the FIFO Size register. Thus, the interrupt service routine needs to write to the AddSize register for every interrupt to clear the interrupt after handling.

The FIFO controller 194 and the PCI-to-ISA bridge 196 in turn is connected to an ISA bus. Mounted on this bus are ISA slots 198 and 200, a non-volatile random access memory (NVRAM) 202 for storing system BIOS information, one or more programmable read only memory (PROMs) 204, and one or more data transfer ports 206, which may be serial ports, parallel ports, and floppy and hard disk ports. The ISA bus is also connected to a register file 208 for maintaining system status information.

Figure 3:
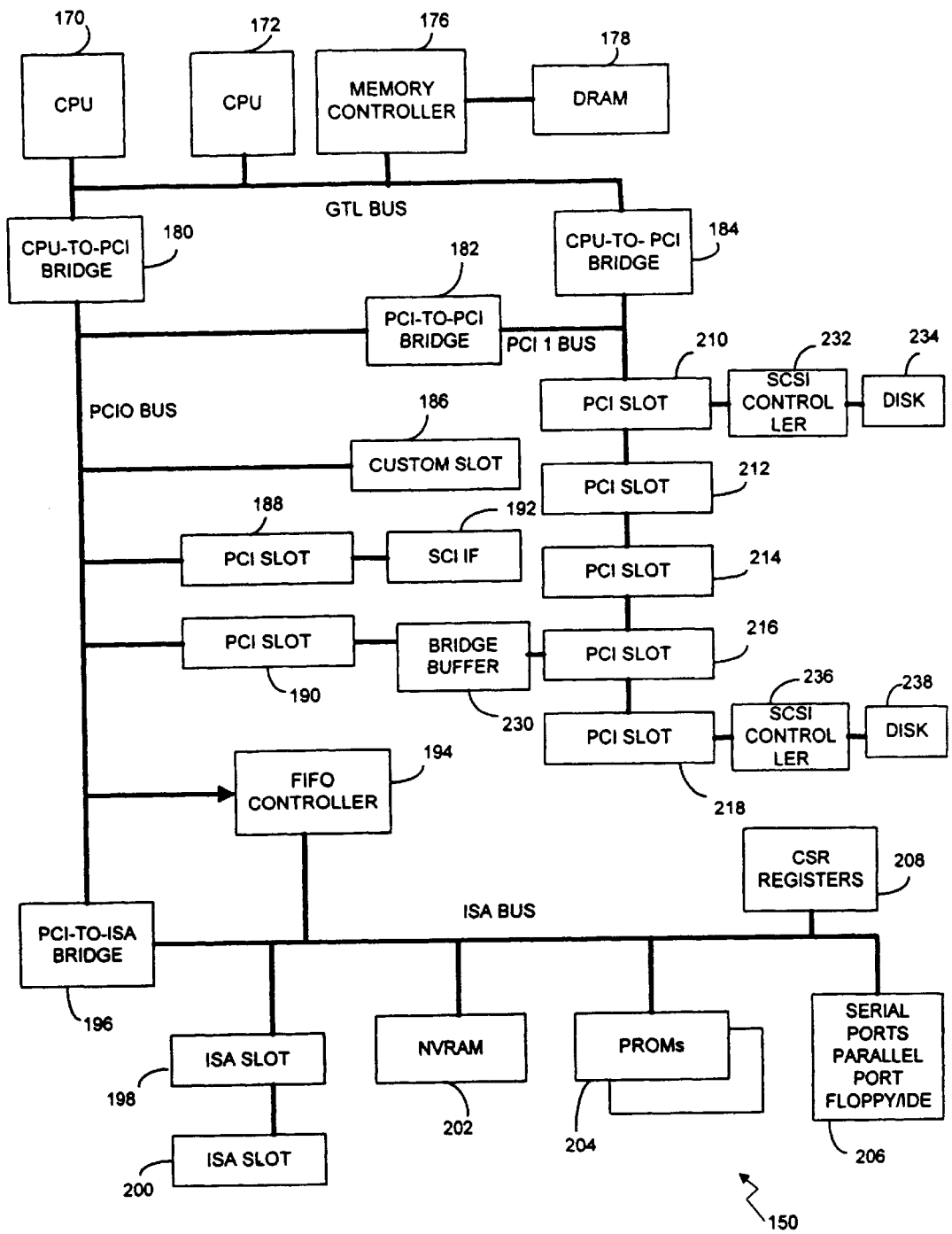
FIG. 3 is a schematic illustration of a file storage processor in FIG. 1.

In the dual PCI bus system of FIG. 3, networking traffic and network interface card (NIC) management data pass on the secondary PCI bus PCI1. This arrangement allows the PCI busses to operate at a lower level of the utilization, thus providing better response time and freeing up channels for the CPU-to-I/O bus transactions. Further, to keep a low CPU overhead and to minimize the CPU system bus load, processing ownership is divided along the lines of data or instruction intensive operations. One of the processors 170 or 172 processes the Internet protocol (IP) through NFS protocol, runs FMK and any other network related code while the remaining CPU 170 or 172 performs functions of an intelligent data moving and checksum engine. In this manner, the dual processor system of FIG. 3 keeps the working set of cache lines of the protocol processing code primarily in cache since instructions are not being replaced by cache fill operations for data being moved or checksummed.

Turning back to FIG. 2, the second CPU-to-PCI bridge 184 is connected to a plurality of PCI slots 210, 212, 214, 216 and 218. Further, each of PCI slots 210–218 is respectively connected to one of network interface cards (NICs) 220–224. In this manner, the network processor 110 provides sufficient network data transfer capability using NICs 220–224.

FIG. 3 illustrates one embodiment of the file storage processor (FSP) 150 or 160. While the NP 110 and FSP 150 share a common design reference to reduce cost, the FSP 150 has components dedicated to disk I/O operations. One difference between the NP 110 of FIG. 2 and the FSP 150 of FIG. 3 is the substitution of network interface cards 220–224 with SCSI controllers 232–236, which in turn controls one or more disks 234–238, respectively.

Another difference between the NP 110 of FIG. 2 and the FSP 150 of FIG. 3 is the use of a bridge buffer 230 coupling PCI slots 190 and 216 together. The bridge buffer 230 is positioned between the PCI buses to enable disk data accesses over the SCI interconnect bus 120 to be routed directly to the disk controllers 232–236 controlling the data storage devices rather than going through the processor as a middleman, thus enhancing performance while decreasing bus contention. The bridge buffer 230 increases system performance by reducing write latency and improving redundant array of inexpensive disk (RAID) performance in both normal and degraded mode. The bridge buffer 232 acts both as a nonvolatile staging buffer for writes to any single disks or array and also as a multi-function hardware exclusive or engine.

The bridge buffer 230 minimizes latency by requiring little or no software intervention to perform its various functions. That is possible because the control of different read support functions is mapped within the bridge buffer 230 address base and thus allows commands to be encoded in upper bits of the address pointers using direct memory access (DMA) transfers. As a result, concurrent streams of data can be supported in and out of the bridge buffer 230. The DMA transfer capability allows data to be rapidly moved from disk controllers 232–236 to NPs 110 or 112 over the interconnect bus 120 via the bridge buffer 230.

In the bridge buffer 230, a memory buffer which is partitioned into a metadata cache and a write cache, among others. The write cache buffers writes to the disk drives and thus enhances performance, since memory writes are a magnitude order faster than disk writes. The metadata cache contains file management information, which supports both multiple file allocation and random access. The file management information can convert a logical block number into a physical sector number by indexing into an array using the logical block number. In addition to logical-to-physical block mapping, the metadata cache includes information on the type and access mode for the file, the file's owner, the group access identifier, the number of references to the file, the time the file was last read and written, the time the metadata cache was last updated, the size of the file, and the number of physical blocks used by the file, among others. The directory name look up table is used to speed up directory searches, as UNIX file system (UFS) directories are flat and are searched sequentially. Further, the directory name look up table maintains hits and misses for short file names.

Figure 4:
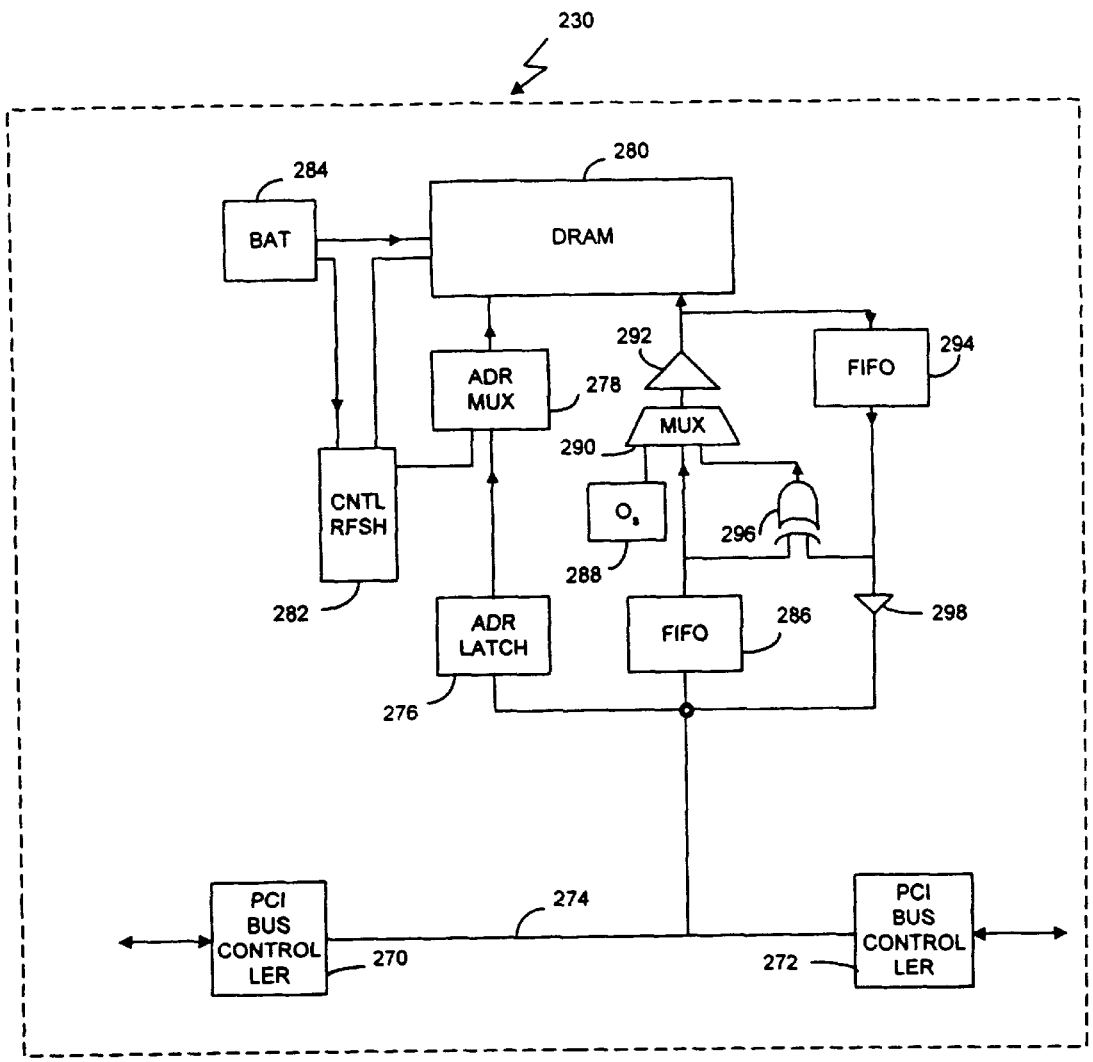
FIG. 4 is a schematic illustration of a bridge for providing direct access to data storage devices in FIG. 3.

FIG. 4 shows a more detailed description of the preferred embodiment of the bridge buffer 230. The bridge buffer 230 has a configurable, non-volatile DRAM storage 280 and a high performance hardware exclusive-or (XOR) engine 296. A plurality of PCI bus controllers 270 and 272 are respectively coupled to PCI slots 190 and 216 (FIG. 3). The PCI interface for bus controllers 270 and 272 includes a bidirectional chaining DMA capability for memory to memory transfers between the write buffer 230 and the DRAM 178.

The PCI bus controllers 270 and 272 in turn are connected to an internal bus 274. Also connected to the bus 274 is an address latch 276. The output of the address latch is connected to an address multiplexer 278. The output of the address multiplexer 278 is connected to the DRAM array 280. Also connected to the DRAM array 280 is a memory controller 282 which performs refresh functions, among others. Additionally, the DRAM 280 and the controller 282 is supported by back up batteries 284 in the event of unscheduled power outage.

For RAID operations, the DRAM 280 can be configured as two separate but logically paired buffers. Each buffer can be accessed through a separate address space. The usage of the two buffers differ in that a DATA buffer holds unmodified copies of the write data while a XOR Buffer is used for data parity generation. The logical pairing allows same DMA transfers in and out of the bridge buffer 230 to also drive the parity generation logic. This has the twofold benefit of increasing effective memory bandwidth and reducing control complexity.

The bridge buffer 230 also provides the exclusive OR (XOR) engine 296 to assist in performing the RAID operations. The XOR engine 296 is integrated into the data path and is used to generate new parity for data writes, reconstruct data upon a device failure, verify the correctness of the parity of a RAID, and to initialize (zero) buffers. The different functions of the XOR engine 296 are selected by decoding the address bits of the internal bus 274 so that upper address bits will be decoded as commands to the bridge buffer 230.

Typically, all write accesses to the XOR engine map to a XOR function. For example a XOR write results in a read-modify-write transaction to the XOR buffer. The old data is read out of the XOR buffer into a FIFO register in the XOR engine and then XORed with the new data and the result is written back into the XOR buffer, all without affecting the DATA buffer.

Turning now to the exclusive OR engine 296, a first-in-first-out (FIFO) 286 is connected to the internal bus 274. The FIFO 286 in turn drives a multiplexer 290. The multiplexer 290 also receives the input from a zero register 288 as well as the output of an exclusive OR gate 296.

One input of the exclusive OR gate 296 is connected to the output of the FIFO 286, while the other input is connected to the output of a second FIFO 294. The output of the multiplexer 290 drives a buffer 292 which is turn is connected to the DRAM 280. The output of the buffer 292 is also connected to the input of the FIFO 294. Additionally, the output of the FIFO 294 is provided to a buffer 298 which is turn is connected to the internal bus 274.

The placement of the XOR engine 296 in the data path allows XOR operations to be performed on the fly without processor intervention, thus improving RAID throughput and reducing the RAID write bandwidth load on the secondary PCI bus.

The XOR functionality supports efficient support for small RAID Writes, large RAID Writes (or data streaming), read recovery and disk array verification. The access modes to the bridge buffer 230 that can be selected by address decoding include:

Transparent(R/W) mode which is a transparent access to or from the entire bridge buffer 230. It can be used for diagnostic access or transferring unmodified data. A small amount of the address frame is set aside for configuration registers. The transparent read is used to unload the XOR buffer to disk.

Mirror Write (W) mode which causes a copy to be written to the XOR buffer at the same time as data is written to the data buffer. It is used to initialize the XOR buffer for parity generation.

XOR (R/W) mode, which treats read and write functions differently. A write to the XOR address space becomes a read modified write cycle used to generate the read parity block. Data in the XOR buffer is exclusive-ORed with data being written to the XOR buffer and the result written back to the XOR buffer. A read, on the other hand, transfers data from the data buffer to disk and generates parity in the XOR buffer during the same transfer using a stripe register to select a parity block.

A Mirror Write operation is used to initialize the XOR buffer for parity generation. In this case, initialization means that a copy of data written to the DATA buffer is also in placed in the XOR buffer. The XOR buffer and DATA buffer locations are paired so that the same DMA address can be used to access both during the same transfer. The benefit of initializing the parity buffer at the same time that data is received into the data buffer is that reads from disk of original data and original parity can be scheduled without regard to order.

Figure 5:
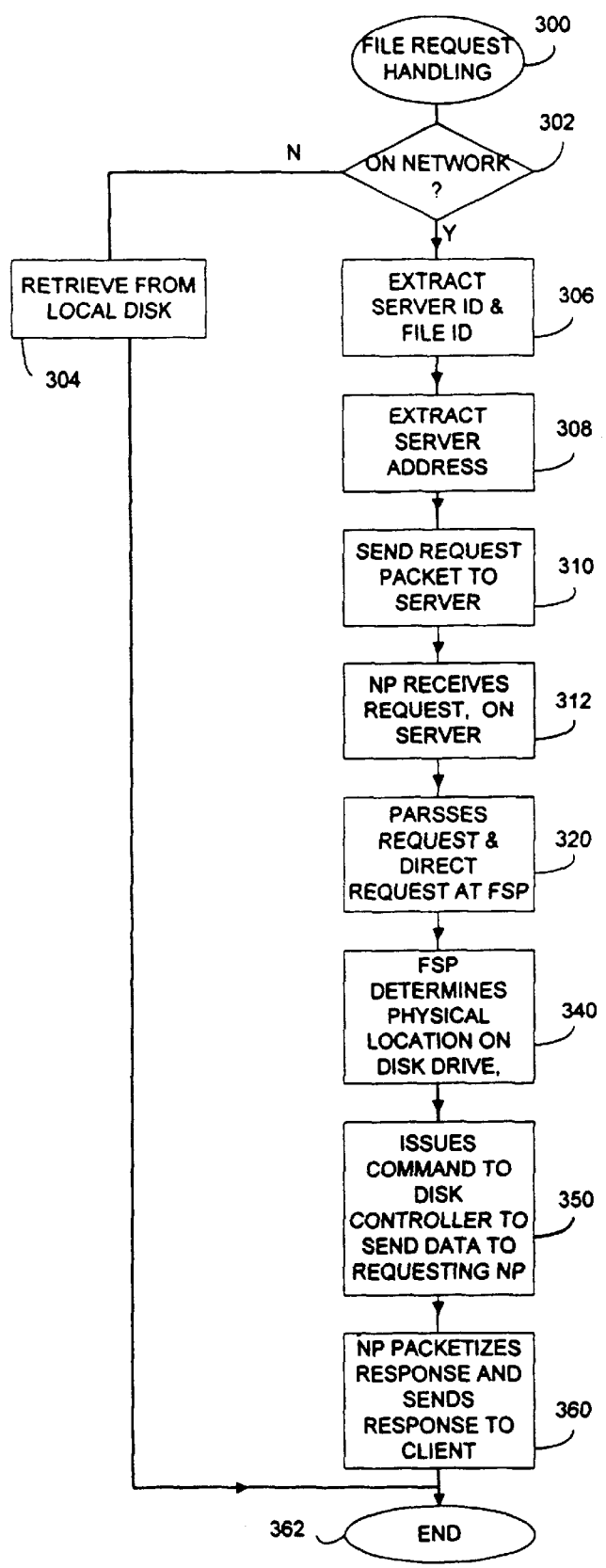
FIG. 5 is a flow chart illustrating a file request handling process.

FIG. 5 shows a process 300 for handling file requests. The process 300 initially checks whether the requested data resides locally or on one of the FSPS 150 or 160 over the network (step 302). If data is not on the network, the process 300 retrieves data from the local disk drive of the client 90 (step 304) before exiting (step 362).

Alternatively, if data resides on the network, the process 300 extracts a server identification (ID) as well as a file ID number from the requested file (step 306). Next, the process 300 extracts a server address from the server ID (step 308). After extracting the server address, the process 300 sends a request packet to the server of FIG. 1 (step 310).

At this stage, the packet sent over the network 100 is received by to the network processor (step 312). The network processor 110 parses the request and directs the request at one of FSPs 150 or 160 (step 320). The file storage processor 150 or 160 determines the physical location on the disk drive and issues commands to one of disk controllers 142–144 to directly send data to the requesting network processor 110 using the bridge buffer 132 (step 340). The disk controllers 142–144 performs the action as requested and after retrieving the appropriate data, proceeds to send the requested data directly to the network processor 110 via the buffer bridge 132, the SCI interface 130 and the SCI bus 120 (step 350).

Upon receipt of data from the data storage device via the bridge buffer 132, the network processor 110 packetizes data and sends the packets of data as a response to the client request (step 360) before exiting (step 362). In this manner, the buffer bridge 132 provides a short-cut for data transmission from the data storage device to the client which reduces the FSP local processor overhead, minimizes bus contention inside the FSP, and eliminates buffering requirement on the FSP RAM.

Figure 6:
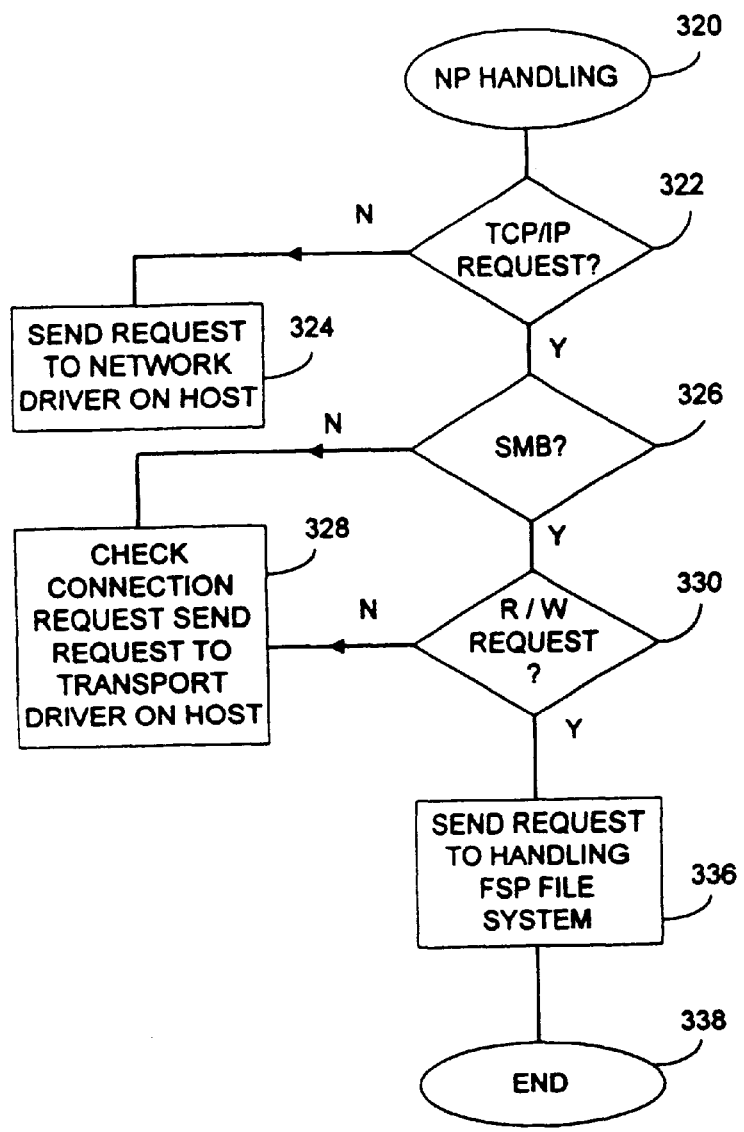
FIG. 6 is a flow chart illustrating a process on the network processor of FIG. 2 for handling file requests.

FIG. 6 shows more detail of the network processor handling process 320 (FIG. 5). Upon entry, the process 320 determines whether the request is a transmission control protocol/Internet protocol (TCP/IP) request (step 322). If not, the request may be related to host processor operations and thus the request is forwarded to a network driver on the host (step 324).

Alternatively, the process 320 checks whether the message is a server message block (SMB) type (step 326). If so, the process 320 further checks if the request is a connection request. If the request is a connection request, the process 320 also sends the request to a transport driver on the host for handling (step 328).

In step 326, if the message is an SMB message, the process 320 further checks if the request is a read/write request (step 330). If not, the request is sent to the transport driver (step 328). Alternatively, if the request is a read/write request, the request is sent to the appropriate FSP file system (step 336) before the process 320 exits (step 338).

Figure 7:
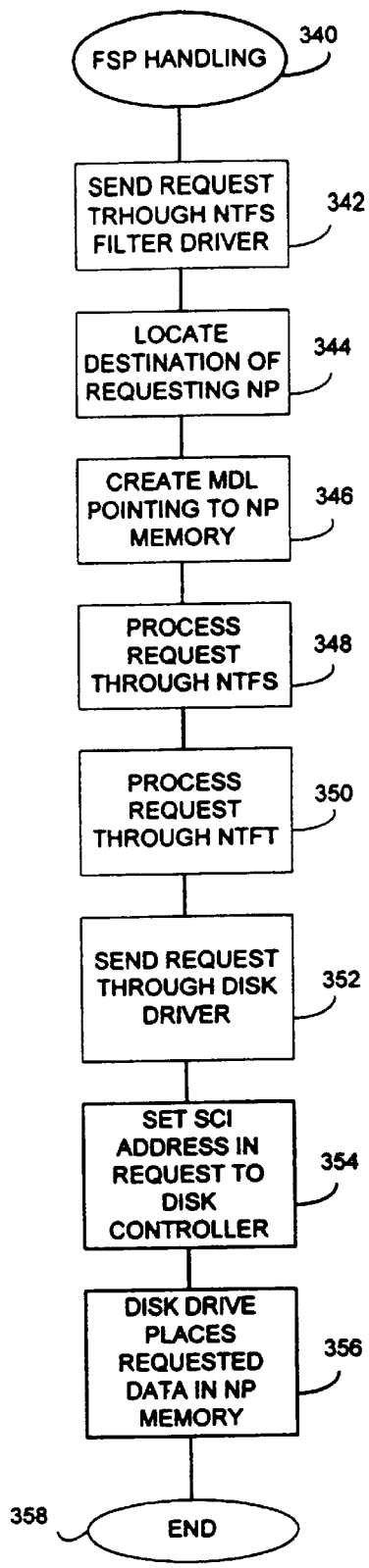
FIG. 7 is a flow chart illustrating a process on the file storage processor of FIG. 3 for handling file requests.

FIG. 7 shows the process 340 (FIG. 5) for handling requests in the file storage processor. Generally, to perform a direct DMA move of data from disk to NP buffers, the process 340 passes SCI addressing information through a Windows NT file server (NTFS), and, if necessary, through intermediate drivers, to a customized SCSI driver to cause data read requests to be DMA'd directly to buffers on the NP 110 or 112.

In process 340, the request is submitted to a Windows NT file server filter driver (step 342). Next, the destination buffer on the requesting network processor is identified (step 344). The process 340 then creates a memory descriptor location (MDL) pointing to the network processor memory buffer location (step 346). The MDL resides in a "reserved" memory so that Windows-NT will not use it for normal paging operation. Originally introduced to allow direct transfer between a video buffer and SCSI, MDLs that describe memory in the reserved area can be built and manipulated using standard MDL calls.

Next, the request is processed by the Windows NT file system (step 348). The request is further processed by a Windows NT fault tolerance module which performs various RAID functions (step 350). The file storage processor then sends the request to the customized disk driver in step 352. The disk driver is a modified small computer system interface (SCSI) driver which is aware of the SCI interconnect bus. The CIFS server builds MDLs with page entries in their scatter/gather lists which encode SCI addresses of buffers on the NPs. The customized SCSI driver in turn recognizes these entries as "special" since they fall in a range that does not correspond to any normal memory pages and thus will decode SCI addresses from these entries.

Next, the process 340 sets an SCI address in the request to the disk controller (step 354) and sends the request to the disk controller. In turn, the disk controller 142 or 146 in the FSP 150 performs requested I/O operation and directly DMAs the requested data onto the network processor memory buffer (step 356) before exiting (step 358).

An exemplary code illustrating the above processes which handle disks I/O requests by passing SCI addressing information down through the NTFS layer to the custom SCSI driver to cause the data read requests to be DMA'd directly to buffers on the NP 110 is shown below:

```
#if (OSM_BUS_ADDRESS_SIZE==64)
    sgptr→sp_sg.sg_laddr=phyrq→pr_sglist[ii].sg_laddr;
    if (phyrq→pr_sglist[ii].sg_m16_node)
        sgptr→sp_sg.sg_m16— node=
    NODE_TO_PNODE(phyrq→pr_sglist[ii].sg_m16_
        node);
    else
        sgptr→sp_sg.sg_m16_node=0; /* local */
    if (sgptr→sp_sg.sg_m16_node) /* position node address
        etc */
        sgptr→sp_sg.sg_m16_node=((sgptr→sp_sg.sg_
            m16_node<<14)
            |(PSB_SCSI_STREAM<<11));
    sgptr→sp_sg.sg_len=phyrq→pr_sglist[ii].sg_len;
#else
    sgptr→sg_ladd=phyrq→pr_sglist[ii].sg_laddr;
    sgptr→sg_len=phyrq→pr_sglist[ii].sg_len;
#endif /* OSM_BUS_ADDRESS_SIZE */
    sgptr--;
#if (OSM_BUS_ADDRESS_SIZE==64)
    sgptr→sp_sg.sg_len |=0x80000000; /* terminator */
#else
    sgptr→sg_len |=0x80000000; /* terminator */
#endif /* OSM_BUS_ADDRESS_SIZE */
```

The above code is a specific implementation of aspects of the invention, and the invention is not to be limited to the details therein. Additionally, although the NPs and FSPs have been described with respect to one implementation using Pentium-Pro processors with PCI buses, other processors and buses may be used.

Because I/O shortfall is dramatic in the UNIX and Windows-NT environment, the description of the preferred embodiment of the present invention was on UNIX and NT file servers. However, the architectural principles that solve the UNIX and NT server I/O problem extend easily to server performance bottlenecks in other operating system environments as well, including a Macintosh OS-8 operating system, available from Apple Computers of Cupertino, Calif. Similarly, the description of the preferred embodiment focused on Ethernet implementations, though the principles extend easily to other types of networks.

Other embodiments are within the scope of the following claims.

What is claimed is:

1. A method for processing file requests from a client, comprising:

receiving a request on a network processor;

parsing the request and sending the request to a file storage processor over an interconnect bus;

identifying a memory buffer on the network processor for receiving data in response to the request;

issuing a command to a disk controller in the file storage processor to send data directly to the memory buffer on the network processor; and sending data to the client via a bridge without assistance from a file storage processor CPU.

2. The method of claim 1, further comprising the step of identifying a server, including:

extracting a server identification and a file identification from the request; and identifying a server address from the server identification.

3. The method of claim 1, further comprising the step of identifying whether the request is a server message block (SMB) read/write request.

4. The method of claim 3, further comprising the step of transferring the request to a host processor for handling if the request is not a server message block (SMB) read/write request.

5. The method of claim 1, wherein the file storage processor manages a file system, the method further comprising a file system handling step, including:

sending the request through a filter driver;

locating the memory buffer on the requesting network processor for receiving data;

creating a memory descriptor location (MDL) pointer for the network processor memory buffer;

sending the request through a disk driver;

setting the MDL pointer in the request to the disk controller; and requesting the disk controller to access disks and place the requested data on the network processor memory buffer.

6. The method of claim 5, wherein the file system is a UNIX file system.

7. The method of the claim 5, wherein the file system is a Windows NT file system.

8. The method of claim 7, wherein the file system processing step further comprises a step of submitting the request through a Windows NT-fault tolerant module.

9. A method for satisfying requests from a client in a computer system having a scalable interconnect (SCI) bus and a file storage processor with first and second local buses, the first local bus coupleable to the SCI interconnect bus; one or more data storage device controllers coupled to the second local bus; and a bridge positioned between the first and second local buses for transferring data directly from the data storage controllers to the client over the SCI interconnect bus, the method comprising:

(1) receiving requests from the client;

(2) identifying a buffer having an SCI address on a network processor;

(3) setting the buffer SCI address in a scatter/gather command;

(4) issuing the scatter/gather command to a disk controller; and (5) passing data through the bridge to the client without assistance from a file storage processor CPU.

10. The method of claim 9, further comprising the step of performing redundant array of inexpensive disks (RAID) operation on data passing through the bridge.

11. A file server configured to process network information, comprising:

a first local bus capable of being connected to a network processor, wherein the network processor can be used to communicate with a client;

a second local bus capable of being connected to disk controllers that perform I/O operations on a data storage device;

a buffer in the network processor configured to receive data from the data storage device at an address;

an interconnect bus operatively coupled to the first local bus, the second local bus, and the network processor wherein the network processor receives information in the buffer through the second local bus and the interconnect and delivers the information to a client, and wherein a file storage processor delivers the information to the buffer through the interconnect and the first local bus without assistance from a file storage processor CPU.

12. The file server of claim 11, further comprising one or more data storage devices coupled to one or more data storage controllers.

13. The file server of claim 11, wherein each of the first and second local buses is a peripheral component interconnect (PCI) bus.

14. The file server of claim 11, the file storage processor CPU being coupled to the first and second local buses, the file storage processor CPU instructing the data storage controller to deposit data to the buffer via a bridge.

15. The file server of claim 11, further comprising a bridge coupled to the first and second local buses to deliver information to the buffer through the interconnect bus.

16. The file server of claim 15, wherein the bridge further comprises:

a memory array for buffering writes to the data storage devices; and an exclusive OR engine coupled to the memory array for performing redundant array of inexpensive disk (RAID) operations.

17. The file server of claim 11, wherein the interconnect bus is a Scalable Coherent Interface (SCI) bus.

18. A file server configured to process file storage, comprising:

a first local bus capable of being connected to a network processor, wherein the network processor can be used to communicate with a client;

a second local bus capable of being connected to disk controllers that perform I/O operations on a data storage device;

an interconnect bus operatively coupled to the first local bus, the second local bus, and a file storage processor wherein the file storage processor requests information from the data storage device through the second local bus and the data storage device delivers the information without assistance from a file storage processor CPU to the client through the interconnect and the first local bus.

19. The file storage processor of claim 18, further comprising one or more data storage devices coupled to one or more data storage controllers.

20. The file storage processor of claim 18, wherein each of the first and second local buses is a peripheral component interconnect (PCI) bus.

21. The file storage processor of claim 18, further comprising, the file storage processor CPU being coupled to the first and second local buses, and the file storage processor CPU instructs the data storage controller to deposit data to a buffer via a bridge.

22. The file storage processor of claim 18, further comprising a bridge coupled to the first and second local buses to deliver information to a buffer through the interconnect bus.

23. The file storage processor of claim 22, wherein the bridge further comprises:
   a memory array for buffering writes to the data storage devices; and
   an exclusive OR engine coupled to the memory array for performing redundant array of inexpensive disk (RAID) operations.

24. The apparatus of claim 18, wherein the interconnect bus is a Scalable Coherent Interface (SCI) bus.

* * * * *